Figure 1:
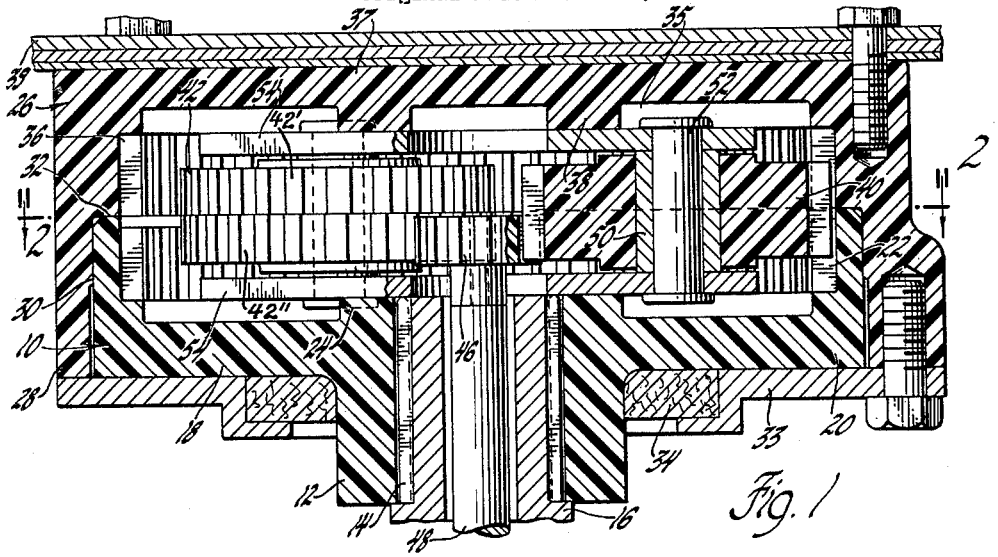

March 19, 1963 M. J. DUER 3,081,648
COMPOUND EPICYCLIC GEAR MECHANISM
Original Filed Dec. 11, 1958

INVENTOR.
Morris J. Duer
BY
E. E. James
ATTORNEY

United States Patent Office 3,081,648
Patented Mar. 19, 1963

3,081,648
COMPOUND EPICYCLIC GEAR MECHANISM
Morris J. Duer, Indianapolis, Ind., assignor to General Motors Corporation, Detroit, Mich., a corporation of Delaware
Original application Dec. 11, 1958, Ser. No. 779,781. Divided and this application Mar. 22, 1961, Ser. No. 97,624
8 Claims. (Cl. 74—801)

This invention relates to planetary gear mechanisms and particularly contemplates an improved compound epicyclic gear mechanism of relatively simple and inexpensive construction capable of precise free-rolling, lash-free translation of a relatively high speed rotational input into a relatively slow speed rotational output.

The instant application is a division of my copending application Serial No. 779,781, filed December 11, 1958, and entitled, "Self-Cleaning Air Filter," wherein the compound epicyclic gear grain of this invention is used in a self-purging air cleaner for an internal combustion engine or the like to rotatably mount and drivingly interconnect a backwash cleaned filter cartridge with a high speed turbine driven by the engine air intake suction. While the inexpensive simplicity and operating characteristics and life of the instant gear train encourage and promote its use in the relatively inexpensive self-purging air cleaners of the pending application, this gear train is also capable of use for the accurate transmission of control signal data between the several stations of a servo control mechanism of the type used in computers, navigational control instruments, guidance control systems, and the like.

Servo control mechanisms of the type mentioned require extreme precision in critical data transmitting gear trains since any instantaneous inaccuracies resulting from gear meshing error or backlash directly affect the circular error probability of the system. In the fine pitch gearing necessarily employed in such servo and instrument control systems, gear train error may result from deviations from the theoretically ideal in various dimensions of the gears themselves or in their assembly, either in their original manufacture or as a result of wear. Among such factors may be reduced gear tooth thickness, increased gear center distances, bearing play, eccentricities in gears, ball bearings or shafts, variations in clearances between the operating parts such as between the shaft and bearing, and the lack of rigidity in parts and structure, particularly in applications requiring extreme miniaturization of system components. Such factors have made attainment of the desired, necessary and ever increasing gear accuracies required for precise data transmittal in such servo control mechanisms extremely difficult to achieve, particularly in quantity manufacture. Environmental and operational factors and sometimes necessary extreme variations in these factors often dictate the use of further error inducing design clearances. Angular displacement introduced by the application of torque load to the output shaft is a further separate and significant gear error contributing factor adversely affecting accurate data transmission, particularly in high gain servo control loops.

Of the foregoing error contributing factors, reduction in circular gear tooth thickness and variations from standard center distances are factors which are necessarily manufactured into a gear train in order to keep the gear train free running. These two factors avoid the binding which might otherwise result from eccentricity of the gears or bearing, journals. Bearing play, eccentricity in parts, and physical clearances necessarily result from dimensional tolerances and manufacturing vagaries. As indicated above, rigidity is of course governed by the design and physical properties of the structure and its parts whereas the environmental factors are generally dependent upon the application of the gear unit rather than on design details. Angular torque load induced displacement between the input and output members results from the elasticity of the entire gear unit, i.e. the deflection of the gear teeth, torsional deflections of the shafts, etc. Such torque load deflection is thus directly proportional to the load applied.

The invention thus further contemplates a precision data transmitting gear train for servo controlled mechanisms of the type described having means for statistically reducing and averaging the positional error of several simultaneous meshes thereby minimizing the transmission of instantaneous inaccuracies which would otherwise directly affect system error.

The foregoing objectives are accomplished in a compound epicyclic gear set illustrative of the invention, a floating planetary carrier having three equiangularly journaled planetary gears which are precision molded of nylon or of like material providing inherent gear tooth flexibility. These planetary gears drivingly interengage a sun gear of like material with stationary and driven ring gear members having a limited gear tooth differential therebetween, two of the planetary gears having counter-offset gear teeth accommodating variations in gear tooth thickness and providing lash-free, free-rolling, self-centering and balanced load transmitting engagement between the several gears.

Figure 2:
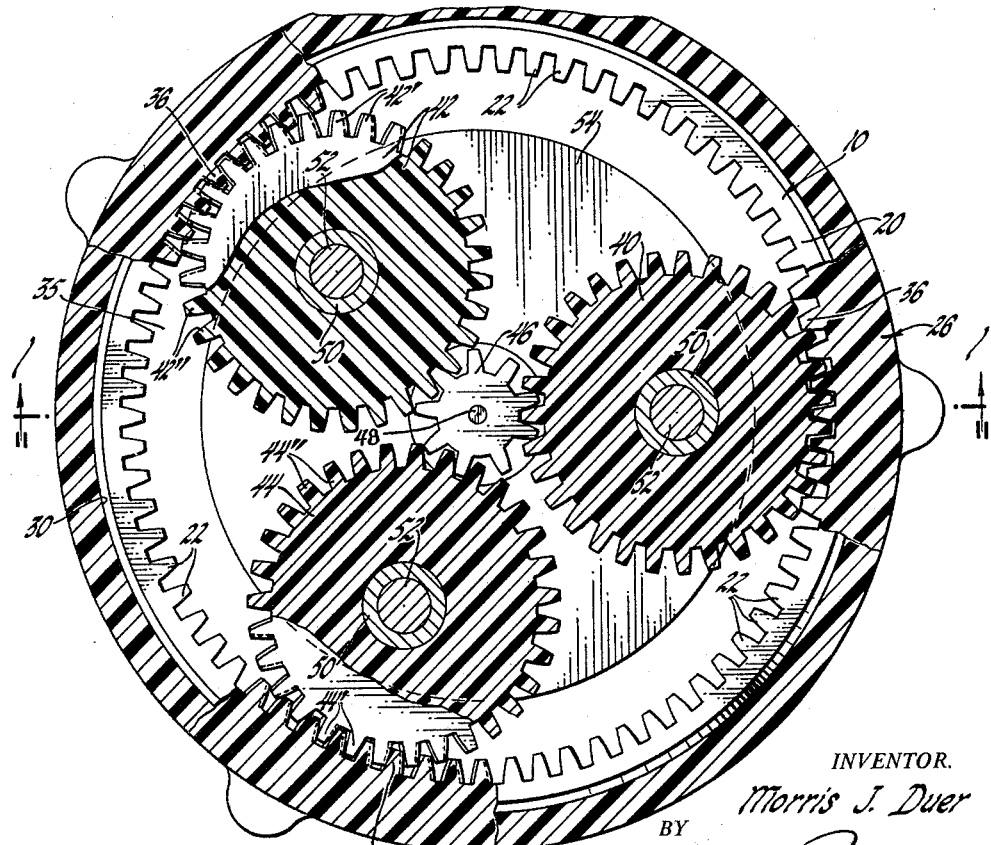

The foregoing and other objects, features and advantages of the invention will be apparent from the following description having reference to the accompanying drawing, in which:

FIGURE 1 is a transverse sectional view of the illustrative gear mechanism taken substantially in the plane of the line 1—1 of FIGURE 2; and FIGURE 2 is a sectional view taken substantially in the plane of the line 2—2 of FIGURE 1.

Referring more particularly to the drawing, the illustrative gear train comprises a stationary ring gear member 10 having a central hub portion 12 which is non-rotatably splined at 14 on the upper end of a cylindrical support member 16. The hub 12 is connected by a radially extending web or spider 18 to an upstanding peripheral flange 20 having a ring of internal teeth 22 formed thereon. The hub 12 projects slightly above the spider portion to provide an annular thrust bearing boss at 24. A second cup-shaped ring gear member 26 is journaled on and supported by the external periphery and upper end face of the stationary ring gear member.

The ring gear member 26 has a peripheral flange 28 of stepped internal diameters providing journal and thrust bearing surfaces thereon at 30 and 32, respectively. These bearing surfaces of the ring gear member 26 are maintained in proper engagement with the mating bearing surfaces of the stationary ring gear member 10 by a retaining and end thrust bearing plate 33. This plate is suitably secured to the lower end face of the flange 28 and inwardly supports a bearing seal member 34. The two ring gear members thus cooperate to define a drive housing chamber 35 therebetween. The flange 28 is provided with a ring of internal gear teeth 36 intermediate the thrust shoulder 32 and an end wall 37 extending radially inwardly of the upper end of the flange. The end wall 37 has an annular thrust bearing boss 38 co-axially aligned with and spaced from that of the stationary ring gear. The ring gear member 26 is drivingly connected to an output load member such as the filter cartridge assembly shown in the above-identified application Serial No. 779,781. The end wall portion of such a filter cartridge assembly is partially shown at 39 in FIGURE 1 and is suitably secured to the ring gear end wall 37 by a plurality of equiangularly spaced screws or bolts.

The ring gear members 10 and 26 have slightly different numbers of involute gear teeth, e.g. a one, two or three tooth differential, dependent upon the ratio of reduction desired. These two ring gears are engaged by three planetary idler gears 40, 42 and 44 which are rotatably driven by a sun gear 46 secured to one end of a turbine driven shaft 48. The shaft 48 is suitably journaled with respect to the support tube 16 by a remote alignment accommodating bearing, not shown. The several planetary gears are centrally bushed at 50 and rotatably mounted by three equiangularly spaced spindles 52 which extend through and suitably secure two axially spaced annular carrier plates 54. These carrier plates are mounted in rotatable end thrust relation with the ring gear bosses 24 and 38 thus permitting the carrier assembly to float radially to equalize the driving relation between the several gears.

Although the planetary gears engage ring gears of different tooth number, the necessary clearances and minor differences in gear tooth configuration permit the use of planetary gears having a single tooth configuration. However, the several gears are preferably precision molded of nylon, Zytel or other suitable thermosetting plastic material providing an inherent but limited degree of gear tooth flexibility and prolonged lubricant-free operation with minimal wear between the several gear teeth and bearing surfaces. When thus formed, the planetary gears 42 and 44 are preferably provided with oppositely offset bands of gear teeth 42', 42" and 44', 44", respectively. As viewed in FIGURE 2, the upper teeth 42' of the gear 42 are thus offset in a clockwise direction one-third of a gear tooth width ahead of the lower teeth 42", and the upper teeth 44' of the gear 44 are similarly but oppositely offset in a counterclockwise direction one-third of a tooth width behind the lower band 44". The teeth on the third planetary gear 40 are preferably straight.

In the illustrative embodiment, the stationary reaction ring gear 10 and the driven ring gear 26 are formed to provide seventy-two and seventy-three internal involute gear teeth, respectively. This one tooth differential provides a differential speed reduction of 72:1 with respect to the planetary idler gears. These planetary gears each have thirty-one teeth and are drivingly engaged by a nine-tooth sun gear 46. This imparts a 9:1 speed reduction to the planetary assembly with respect to the stationary reaction ring gear 10 and provides an overall reduction ratio for the compound epicyclic gear train of approximately 648:1.

The flexible and staggered gear tooth construction of the several gears insures free involute rolling, lash-free, self-equalizing driving engagement between the several gear members. When used in a servo control mechanism of the type indicated, the inherent limited flexibility of the relatively short unsupported dimension of the several gear teeth permit independent compensation for backlash errors occurring between the several simultaneous meshes as a result of the various gear error contributing factors outlined above. The components of such independent error compensation are resolved through the planetary gear carrier assembly which thus transmits only an average or resultant of the positional errors of the several simultaneous and angularly disposed meshes to the output load member thereby statistically reducing both gear train and probable servo system error.

From the foregoing description of a single illustrative embodiment of the invention, it will be apparent to those skilled in the art that various changes might be made therein without departing from the spirit and scope of the invention as defined in the following claims.

I claim:

1. A compound epicyclic gear mechanism comprising a reaction ring gear member, an output ring gear member rotatably mounted on said first ring gear member, said ring gear members each having a slightly different plurality of internal teeth formed thereon providing a limited gear tooth differential therebetween, a rotatably driven sun gear member spacedly embraced by the internal teeth of at least one of said ring gear members, a plurality of planetary idler gear members drivingly interengaging said sun and ring gear members, carrier means for rotatably supporting said planetary gear members in equiangularly spaced relation to each other, said carrier means including two coaxially spaced annular plate members and gear journaling spindles extending through said planetary gear members and securing said plate members together, and opposed coaxially spaced thrust bearing means associated with said ring gear members and having rotative thrust bearing engagement with said carrier plate members and permitting lateral shifting of said planetary gear carrier means to equalize the gear tooth load transmittal between the several gears.

2. In a compound epicyclic gear drive mechanism as set forth in claim 1, one of said planetary gear members having straight gear teeth and the remainder of said planetary gears having offset bands of gear teeth accommodating the angular differential in the ring gear teeth mating therewith, the permitted gear tooth load equalizing movement of said planetary gear carrier means and the staggered gear teeth of said planetary gear members cooperating to provide free-rolling and lash-free engagement between the simultaneous meshes of the several gears.

3. In a compound epicyclic gear drive mechanism as set forth in claim 1, said planetary gear members being precision formed of a suitable thermosetting plastic material providing limited gear tooth flexibility and permitting prolonged lubrication-free operation with minimal wear.

4. In a compound epicyclic gear drive mechanism as set forth in claim 2, said gear members being precision formed of nylon or of like plastic material providing limited gear tooth flexibility and permitting prolonged lubrication-free operation with minimal wear, the permitted gear tooth load equalizing movement of said planetary gear carrier means, the limited gear tooth flexibility and the staggered gear teeth of said planetary gear members cooperating to provide free-rolling and lash-free resolution of gear error between the simultaneous meshes of the several gears whereby only negligible average gear error is transmitted between the driven sun gear and output ring gear members.

5. A compound epicyclic gear mechanism comprising a cylindrical support member, a first cup-shaped ring gear member non-rotatably carried by said support member, a second cup-shaped ring gear member rotatably journaled on said first ring gear member and cooperating therewith to define a drive housing chamber therebetween, said ring gear members having opposed and coaxially spaced annular thrust bearing bosses thereon and each having a slightly different plurality of internal gear teeth providing a limited gear tooth differential therebetween, a driving shaft rotatably mounted in substantially coaxial relation within said support member and projecting within said drive housing chamber, a sun gear pinion member carried by the driving shaft and spacedly embraced by the internal gear teeth of one of said ring gear members, a plurality of planetary idler gear members drivingly interengaging said sun and ring gear members, carrier means for rotatably supporting said planetary gear members in equiangularly spaced relation to each other and including two axially spaced annular plate members and gear journaling spindles extending through said planetary gears and securing said plate members together outwardly of the bearing bosses, said plate members having rotative thrust bearing engagement with the opposite thrust bosses of said ring gear members permitting lateral shifting of said planetary gear carrier means to equalize the gear tooth load transmittal between the several gears, at least one of said planetary gear members having straight gear teeth and the remainder of said planetary gears having offset bands of gear teeth accommodating the angular differentials of ring gear teeth mating therewith, the permitted gear tooth load equalizing movement of said planetary gear carrier means and the staggered gear teeth of said planetary gear members cooperating to provide free-rolling and lash-free engagement between the simultaneous meshes of the several gears.

6. In a compound epicyclic gear mechanism as set forth in claim 5, said planetary gear members being precision formed and having limited gear tooth flexibility, said gear tooth flexibility cooperating with the permitted movement of said carrier means and said staggered planetary gear teeth to resolve transmission errors between the simultaneous meshes of the several gears whereby only negligible average gear error is transmitted between the driven input shaft and said second ring gear member.

7. A compound epicyclic gear mechanism comprising a reaction ring gear member, an output ring gear member rotatably mounted in coaxial relation to said first ring gear member, said ring gear members each having a slightly different plurality of internal teeth formed thereon providing a limited gear tooth differential therebetween, a rotatably driven sun gear member spacedly embraced by the internal teeth of at least one of said ring gear members, a plurality of planetary idler gear members precision formed of a material providing limited gear tooth flexibility and drivingly interengaging said sun and ring gear members, carrier means for rotatably supporting said planetary gear members in equiangularly spaced relation to each other, and thrust bearing means permitting lateral shifting of said planetary gear carrier means to equalize gear tooth load transmittal between the several gears, the permitted gear tooth load equalizing movement of said planetary gear carrier means and the limited gear tooth flexibility cooperating to resolve the gear error components between the several simultaneous gear meshes whereby only negligible average gear error is transmitted between the driven sun gear and output ring gear members.

8. A compound epicyclic gear mechanism comprising a reaction ring gear member, an output ring gear member rotatably mounted in coaxial relation to said first ring gear member, said ring gear members each having a slightly different plurality of internal teeth formed thereon providing a limited gear tooth differential therebetween, a rotatably driven sun gear member spacedly embraced by the internal teeth of at least one of said ring gear members, a plurality of planetary idler gear members precision formed of a material providing limited gear tooth flexibility and drivingly interengaging said sun and ring gear members, one of said planetary gear members having straight gear teeth and the remainder of said planetary gears having oppositely offset bands of gear teeth accommodating the angular differential in the ring gear teeth mating therewith, carrier means for rotatably supporting said planetary gear members in equiangularly spaced relation to each other, and thrust bearing means permitting lateral shifting of said planetary gear carrier means to equalize gear tooth load transmittal between the several gears, the permitted gear tooth load equalizing movement of said planetary gear carrier means and the limited gear tooth flexibility and the staggered gear teeth of said planetary gear members cooperating to provide free-rolling, lash-free resolution of gear error components between the simultaneous meshes of the several gears thereby transmitting only negligible average gear error between the driven sun gear and output ring gear members.

References Cited in the file of this patent

UNITED STATES PATENTS

| 1,431,167 | McCollum | Oct. 10, 1922 |
| 1,632,123 | Else | June 14, 1927 |
| 2,386,367 | Taylor | Oct. 9, 1945 |
| 2,469,905 | Tatlow | May 10, 1949 |
| 2,516,200 | Geyer | July 25, 1950 |
| 2,862,400 | D'Angelo | Dec. 2, 1958 |

OTHER REFERENCES

"Designing Fabricated Nylon Parts," Machine Design, Zimmerli, March 1954, pages 153–154.